US009552634B2

(12) United States Patent
Nykyforov

(10) Patent No.: US 9,552,634 B2
(45) Date of Patent: *Jan. 24, 2017

(54) METHODS AND SYSTEMS FOR AUTOMATED SELECTION OF REGIONS OF AN IMAGE FOR SECONDARY FINISHING AND GENERATION OF MASK IMAGE OF SAME

(71) Applicant: CIMPRESS SCHWEIZ GMBH, Winterthur (CH)

(72) Inventor: Vyacheslav Nykyforov, Littleton, MA (US)

(73) Assignee: Cimpress Schweiz GmbH, Winterthur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,378

(22) Filed: Feb. 2, 2016

(65) Prior Publication Data

US 2016/0148368 A1 May 26, 2016

Related U.S. Application Data

(62) Division of application No. 13/974,507, filed on Aug. 23, 2013, now Pat. No. 9,251,580.

(51) Int. Cl.
*G06K 9/00* (2006.01)
*G06T 7/00* (2006.01)
(Continued)

(52) U.S. Cl.
CPC .......... *G06T 7/0004* (2013.01); *G06K 9/2081* (2013.01); *G06K 9/342* (2013.01); *G06K 9/38* (2013.01); *G06K 9/46* (2013.01); *G06K 9/4652* (2013.01); *G06T 5/002* (2013.01); *G06T 7/0081* (2013.01); *G06T 7/0085* (2013.01); *G06T 7/0093* (2013.01); *G06T*

*7/408* (2013.01); *G06K 2009/4666* (2013.01); *G06T 2207/10024* (2013.01);
(Continued)

(58) Field of Classification Search
CPC .... G06T 7/0004; G06T 7/0081; G06T 7/0093; G06T 7/408; G06T 2207/10024; G06T 2207/20072; G06T 2207/20144; G06K 9/342; G06K 9/38; G06K 9/46; G06K 9/4652; G06K 2009/4666
USPC ............ 382/141, 284; 345/581; 358/1.9, 2.1
See application file for complete search history.

(56) References Cited

U.S. PATENT DOCUMENTS 7,016,865 B1 3/2006 Weber et al.
7,931,199 B2 4/2011 Elgar et al.
(Continued)

FOREIGN PATENT DOCUMENTS

EP 1017019 A2 7/2000
EP 1017019 A3 1/2007

OTHER PUBLICATIONS

European Patent Office, "Extended European Search Report," dated Jan. 27, 2015, for EP Application No. 14178794.5.
(Continued)

*Primary Examiner* — Daniel Mariam
(74) *Attorney, Agent, or Firm* — Jessica Costa

(57) ABSTRACT

Automated systems, methods and tools that automatically extract and select portions of an image to automatically generate a premium finish mask specific to the image which require little or no human intervention are presented. Graphical user interface tools allowing a user to provide an image and to indicate regions of the image for application of premium finish are also presented.

15 Claims, 9 Drawing Sheets

(51) Int. Cl.
  *G06K 9/34*  (2006.01)
  *G06K 9/38*  (2006.01)
  *G06T 7/40*  (2006.01)
  *G06K 9/46*  (2006.01)
  *G06K 9/20*  (2006.01)
  *G06T 5/00*  (2006.01)

(52) U.S. Cl.
  CPC ............... *G06T 2207/20072* (2013.01); *G06T 2207/20144* (2013.01); *G06T 2207/20192* (2013.01)

(56) References Cited

U.S. PATENT DOCUMENTS

| | | |
|---|---|---|
| 8,314,828 B2 | 11/2012 | Bombay et al. |
| 9,251,580 B2 | 2/2016 | Nykyforov |
| 2002/0152001 A1 | 10/2002 | Knipp et al. |
| 2003/0140315 A1 | 7/2003 | Blumberg et al. |
| 2004/0095375 A1 | 5/2004 | Burmester et al. |
| 2004/0160457 A1 | 8/2004 | Termotto |
| 2006/0098023 A1 | 5/2006 | Coulthard |
| 2008/0129033 A1 | 6/2008 | Anderson et al. |
| 2009/0169277 A1 | 7/2009 | Fowlkes et al. |
| 2010/0185309 A1 | 7/2010 | Ohiaeri et al. |
| 2013/0235398 A1 | 9/2013 | Bhatti et al. |

OTHER PUBLICATIONS

Tian, et al., "Improving Computer Vision-Based Indoor Waytinding for Blind Persons with Context Information," Computers Helping People with Special Needs, Springer Berlin Heidelberg, Berlin, pp. 255-262, Jul. 14, 2010.

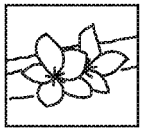
FIG. 4A
FIG. 4B
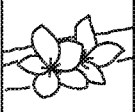
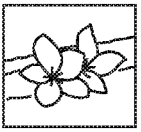
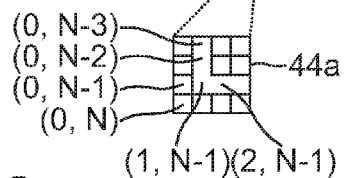
FIG. 4C
FIG. 4D
FIG. 4E
FIG. 4F

METHODS AND SYSTEMS FOR AUTOMATED SELECTION OF REGIONS OF AN IMAGE FOR SECONDARY FINISHING AND GENERATION OF MASK IMAGE OF SAME

FIELD OF THE INVENTION

The present invention relates to designing and manufacturing products having first surface areas having a first type of finish applied and second surface areas having a second type of finish applied, and more particularly, to the methods, tools, and systems for designating areas of different types of finish in a design to be applied to a product based on an image of the design, and further to automated generation of a corresponding mask image associated with the design.

BACKGROUND OF THE INVENTION

Printing services Web sites allowing a user to access the site from the user's home or work and design a personalized product are well known and widely used by many consumers, professionals, and businesses. For example, Vistaprint markets a variety of printed products, such as business cards, postcards, brochures, holiday cards, announcements, and invitations, online through the site www.vistaprint.com. Printing services web sites often allow the user to review thumbnail images of a number of customizable design templates prepared by the site operator having a variety of different styles, formats, backgrounds, color schemes, fonts and graphics from which the user may choose. When the user has selected a specific product design template to customize, the sites typically provide online tools allowing the user to incorporate the user's personal information and content into the selected template to create a custom design. When the design is completed to the user's satisfaction, the user can place an order through the web site for production and delivery of a desired quantity of a product incorporating the corresponding customized design.

Finishes such as foil, gloss, raised print, vinyl, embossment, leather, cloth, and other textured finishes (hereinafter a "secondary finish") that must be applied to a printed product separately from the traditional ink application are typically reserved only for premium printed products due to the expense, time, and equipment required for design, setup, and application of the premium finishes. To add a premium finish to a printed product, at least one premium finish mask, designating areas where the secondary finish is to be applied versus areas where the secondary finish is not to be applied, must be generated. The generation of the mask requires knowledge of which portions of the design are to be finished using the secondary finish (i.e., foiled, glossed, raised print, or other premium finishes).

Currently, there are no tools for automatically extracting regions of a design designated for application of a premium finish (e.g., foil, gloss, raised print, etc.) which would produce satisfactory results in most cases which corresponds well to human judgment. In the printing world, premium finishes are generally used to accent or highlight features of an image. Generally, the determination of which features look good when accentuated using a premium finish is better left to a human designer because humans can more easily understand the meaning and relationship between the different areas of the image and can quickly select those areas of an image that make sense (to other humans) to highlight and to disregard for highlighting those areas that would detract from the overall aesthetics of the final product. It is difficult to translate this type of human judgment into a computer algorithm. Additionally, upon selection of regions of a given design for premium finish, there are currently no tools for automatically generating a secondary finish mask for the design. Thus, for every print design offered by a vendor, the vendor must expend resources designing one or more associated premium finish masks for that particular design. The design of a premium finish mask is therefore typically performed by a human graphics designer, often the same designer who created the print design. It would therefore be desirable to have automated tools available that would automatically extract regions of a given design for premium finish based on a selected area of the design image, and that would automatically generate one or more premium finish masks specific to the given design in order to minimize the amount of human designer time expended on the creation of a particular design without diminishing the quality of the end design and premium finish aesthetics.

Additionally, often customers of a retail printed products provider may wish to provide an image to be printed, and to apply a premium finish (e.g., foil, raised print, etc.) to portions of the image to be applied to the end printed product. No simple tools or techniques for indicating which portions of the image are to be premium finished exist. Instead, a trained designer must hand create an appropriate premium finish mask specific to the image the customer provided to ensure that the premium finish is applied in an aesthetically pleasing manner. Accordingly, it is difficult and expensive for end customers to add premium finish to their own images. It would therefore be desirable to have available web-enabled tools that allow a customer to provide an image and to indicate regions of the image for application of premium finish. It would further be desirable to provide an intuitive user interface that conforms to editing interfaces that customers are already used to dealing with in other document editing applications.

SUMMARY

Various embodiments of the invention include automated systems, methods and tools for automatically extracting and selecting portions of an image for application of a premium finish (i.e., a secondary finish separately applied to a product before or after application of a primary finish). Embodiments of the invention also automatically generate a premium finish mask specific to the image based on the automatic (and optionally, user-modified) segment selections. The system, method and tools require little or no human intervention.

In one embodiment, a method for generating by a computer system a premium finish mask image for applying a secondary finish to a product to be finished with a primary finish includes the steps of receiving an image comprising a plurality of pixels, generating a segmented image having a plurality of pixels corresponding to the respective plurality of pixels of the received image, the segmented image comprising discrete segments each comprising a subset of pixels, receiving a selection of segments designated for premium finish, and automatically generating a mask image having first areas indicating non-premium finish areas and second areas indicating premium finish areas, the premium finish areas corresponding to the selection of segments designated for premium finish.

In an embodiment, the automated premium finish segment selection is subjected to a confidence level test to ensure that the automated selection of segments corresponds well to a human value judgment relative to the aesthetics of premium finish applied to the selected segments in the final product.

In an embodiment, a graphical user interface provides user tools for allowing a user to modify an automatic segment selection In an embodiment, a computerized system automatically receives an image and generates an associated mask image for use in application of premium finish to a product.

BRIEF DESCRIPTION OF THE DRAWINGS

FIG. 4A is an example original digital image;

FIG. 4B is an example of a smoothed version of the original image of FIG. 4A;

FIG. 4C is an example of a color-segmented version of the smoothed image of FIG. 4B, representing the color-segmented version of the original digital image in FIG. 4A;

FIG. 4D is an example of an outer bounding box used for selecting all foreground content of the image of FIG. 4A for designation as premium finish;

FIG. 4E is a gradient image of the selected segment image of FIG. 4D;

FIG. 4F is an example binary mask image created based on the selected segments of FIG. 4D;

DETAILED DESCRIPTION

It will be understood that, while the discussion herein describes an embodiment of the invention in the field of preparation of customized printed materials having premium finish regions such as foil, gloss, raised print, etc., it will be understood that the invention is not so limited and could be readily employed in any embodiment involving the presentation of an electronic image of any type of product wherein it is desired to indicate one or more areas of the image that is to be finished using different finish than other areas of the image.

In accordance with certain aspects of the invention, described herein are automated systems, methods and tools that automatically extract regions of a given design and automatically generate one or more premium finish masks specific to the given design while requiring little or no human intervention. In accordance with other aspects of the invention, a set of web-enabled tools are provided which allow a customer to provide an image and to indicate regions of the image for application of premium finish. In accordance with other aspects of the invention, there are provided simple intuitive user interfaces for indicating regions of an image to be finished with a secondary finish. In accordance with other aspects of the invention, methods for capturing a designer's or customer's intent to premium finish specific parts of an image in the most intuitive, simple, reliable and useful way are described.

As is well known and understood in the art, color images displayed on computer monitors are comprised of many individual pixels with the displayed color of each individual pixel being the result of the combination of the three colors red, green and blue (RGB). In a typical display system providing twenty-four bits of color information for each pixel (eight bits per color component), red, green and blue are each assigned an intensity value in the range from 0, representing no color, to 255, representing full intensity of that color. By varying these three intensity values, a large number of different colors can be represented. Transparency is often defined through a separate channel (called the "alpha channel") which includes a value that ranges between 0 and 100%. The transparency channel associated with each pixel is typically allocated 8 bits, where alpha channel values range between 0 (0%) and 255 (100%) representing the resulting proportional blending of the pixel of the image with the visible pixels in the layers below it.

Figure 1:
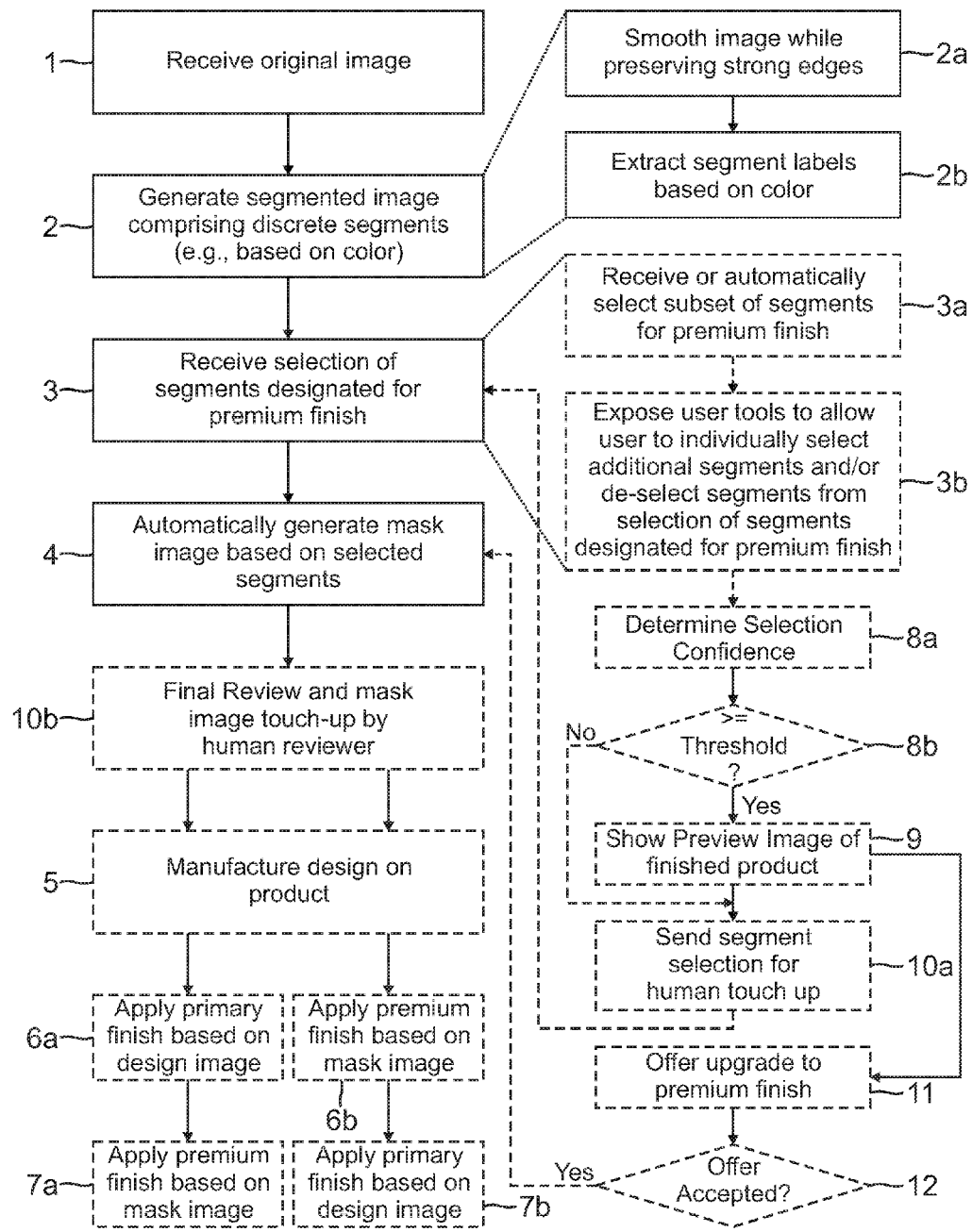
FIG. 1 is a flowchart illustrating an exemplary method in accordance with an embodiment of the invention.

In general, given an image from which to generate a corresponding secondary finish mask, the image is segmented and then certain segments are selected for secondary finish, from which a corresponding mask image is automatically generated. FIG. 1 is a flowchart illustrating the general method. As a preliminary matter to discussion of the details of the method in FIG. 1, the boxes and shapes designating the processing steps of the method are conventionally outlined using a solid line to indicate that the step, or at least an equivalent of the step, is performed, and are otherwise conventionally outlines using a dashed line to indicate that the step may or may not be performed but rather depends on the particular system and application to which it is applied.

Turning now in detail to FIG. 1, there is shown therein a method in which a processing system receives an original design image (step 1), processes the received design image to generate a segmented image comprising a plurality of segments (step 2), receives a selection of segments designated for premium finish (step 3), and generates a mask image indicating the selected segments (step 4). The design image and the mask image are used to manufacture the design on a product (step 5). In one implementation, a primary finish is applied, based on the design image, to the product (step 6a) and then a premium finish is applied based on the mask image (step 7a). In an alternative embodiment, the premium finish is applied first, based on the mask image (step 6b), followed by application of the primary finish based on the design image (step 7b).

As will be discussed in more detail hereinafter, in a preferred embodiment the original design image is segmented by first applying a smoothing filter which preserves strong edges (such as the well-known mean-shift filtering technique) (step 2a) followed by extracting color-based segment labels (for example, using connected component labeling based on color proximity) (step 2*b*).

As will also be discussed in more detail hereinafter, the selection of segments designated for premium finish received in step 3 may be obtained in one of several ways. In a first embodiment, the system is simply instructed of the segments that are to be premium finished—that is the system receives the selected parameters by a remote entity (step 3*a*). In an alternative embodiment, the system heuristically determines a set of segments that are to be selected (also step 3*a*). For example, the system may be configured to receive a selected area of the design image (which can be the entire design (or one to a few pixels just inside the outer boundaries of the image) or a portion of the image thereof), and the system may be configured to separate the foreground from the background and to automatically select only the foreground areas for premium finish. In another embodiment, a set of user tools can be exposed to the user (step 3*b*) to allow the user to individually select and/or deselect individual segments.

In additional embodiments, the system and method may determine a selection confidence measure (step 8*a*) and compare it against a minimum confidence threshold (step 8*b*). In an embodiment, if the value of the selection confidence measure meets or exceeds the minimum confidence threshold, this indicates that the system is confident that the selected set of segments reflect the intent of the user/designer to designate said segments as premium finish. In such case, it may be desirable to display a preview image of the final product containing the product containing the premium finish in the selected areas of the design (step 9). If the value of the selection confidence measure does not meet the minimum confidence threshold, and/or optional in the case where the selection confidence measure does meet the minimum confidence threshold, the segmented image may be sent for human review and touch up to finalize the selection of segments designated for premium finish.

Figure 2:
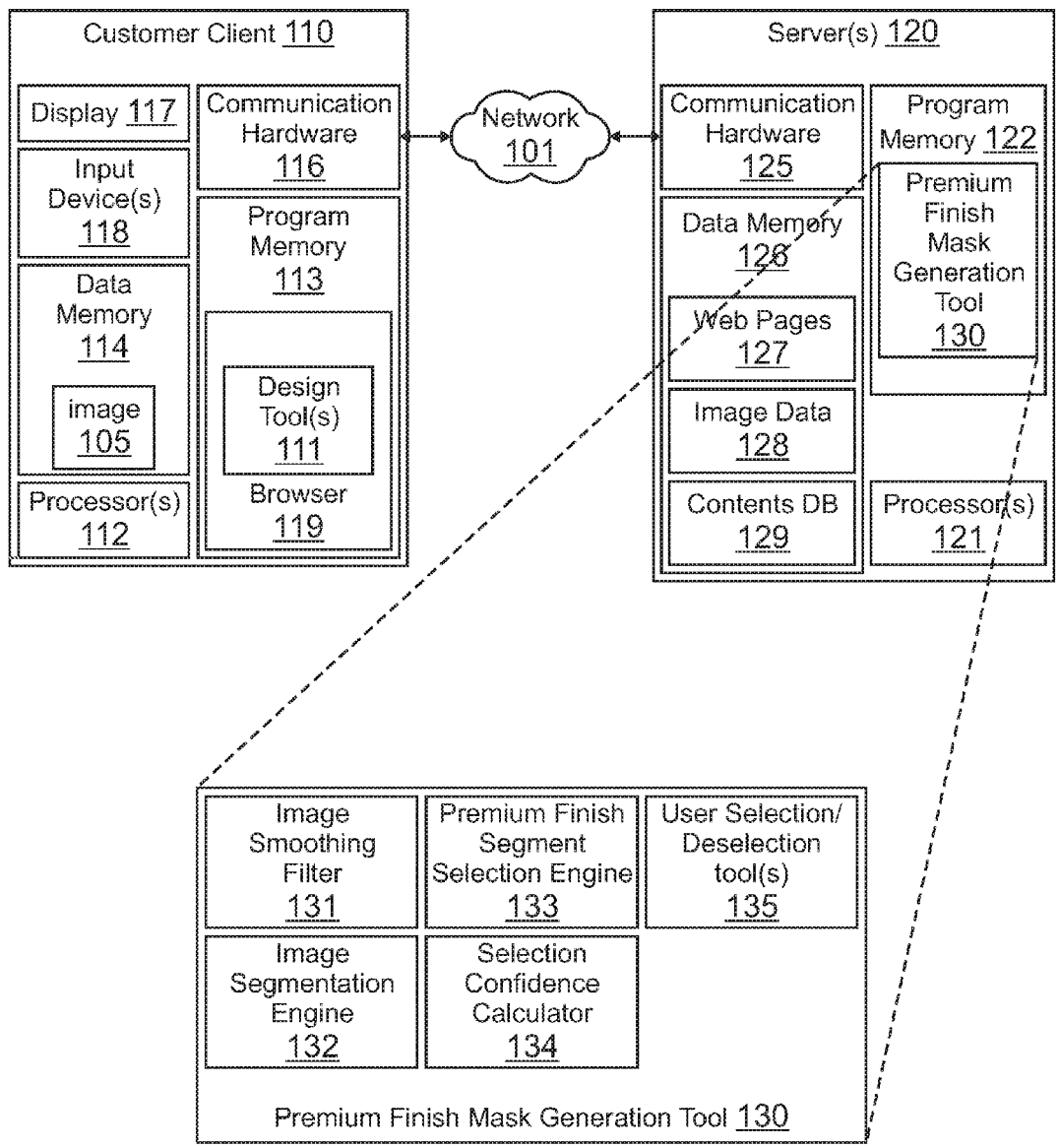
FIG. 2 is a schematic block diagram of an exemplary system in which embodiments of the invention may operate.

FIG. 2 is a block diagram illustrating an exemplary system 100 in which various embodiments of the invention may operate. As illustrated, one or more servers 120 (only one shown) include one or more processors 121, program memory 122 which stores computer-readable instructions for processing by the processor(s) 121, data memory 126 for storing image data 128 such as image(s) 105 received from customers operating client computer(s) 110 and segmented images and mask images associated with the image(s) 105, and communication hardware 125 for communicating with remote devices such as client computer(s) 110 over a network 101 such as the Internet. The program memory 122 includes program instructions implementing a premium finish mask generation tool 130, which may include an image smoothing filter 131, a color segmentation engine 132, a premium finish segment selection engine 133, and a selection confidence calculator 134.

One or more client computer(s) 110 (only one shown) is conventionally equipped with one or more processors 112, computer storage memory 113, 114 for storing program instructions and data, respectively, and communication hardware 116 configured to connect the client computer 110 to the server 120 via the network 101. The client 110 includes a display 117 and input hardware 118 such as a keyboard, mouse, etc., and executes a browser 119 which allows the customer to navigate to a web site served by the server 120 and displays web pages 127 served from the server 120 on the display 117.

Memory 122, 126, 113, and 114 may be embodied in any one or more computer-readable storage media of one or more types, such as but not limited to RAM, ROM, hard disk drives, optical drives, disk arrays, CD-ROMs, floppy disks, memory sticks, etc. Memory 122, 126, 113, and 114 may include permanent storage, removable storage, and cache storage, and further may comprise one contiguous physical computer readable storage medium, or may be distributed across multiple physical computer readable storage media, which may include one or more different types of media. Data memory 126 may store web pages 127, typically in HTML or other Web browser renderable format to be served to client computers 110 and rendered and displayed in client browsers 119. Data memory 126 also includes a content database 129 that stores content such as various layouts, patterns designs, color schemes, font schemes and other information used by the server 120 to enable the creation and rendering of product templates and images. Co-owned U.S. Pat. No. 7,322,007 entitled "Electronic Document Modification", and U.S. Pat. Publication No. 2005/0075746 A1 entitled "Electronic Product Design", each describes a Web-based document editing system and method using separately selectable layouts, designs, color schemes, and font schemes, and each is hereby incorporated by reference in its entirety into this application.

Figure 3:
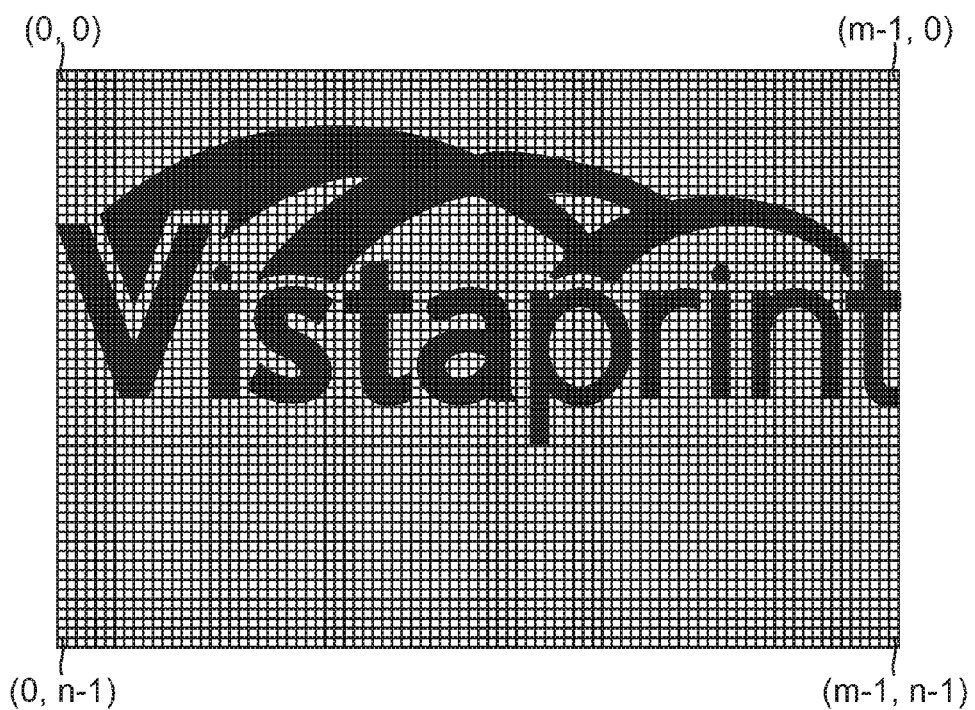
FIG. 3 is an example pixel map of a digital image illustrating the individual pixels of the image.

In preface to a more detailed discussion of the premium finish mask generation tool 130, which in one embodiment executes on the server 120 (but could alternatively be executed on a stand-alone system such as the client computer system 110), a brief discussion of digital image storage and display is useful. A digital image is composed of a 2-dimensional grid of pixels. For example, with reference to FIG. 3, a digital image comprises a number of pixels arranged in a rectangular grid. Each pixel is represented by its corresponding positional x- and y-coordinates in the grid. For example, an m×n pixel image would be represented as m columns and n rows, with pixel (0, 0) conventionally referencing the top left pixel of the image, and pixel (m−1, n−1) conventionally referencing the bottom right pixel of the image. The number of pixels in the image defines the resolution of the image, where high-resolution images have a higher density (and therefore number) of pixels than low-resolution images. The specification of each pixel depends on the type of image (grayscale vs. color, the type of color model used, and the number of gray levels/colors). For example, by a grayscale image, each pixel may be represented by a single brightness value ranging from 0 (no brightness—i.e., completely dark) to 255 (full brightness—i.e., completely light). In a color image, each pixel may be represented by multiple values. For example, in an RGB color model, the color of each pixel is defined by a corresponding Red value (ranging from 0-255), a corresponding Green value (ranging from 0-255), and a corresponding Blue value (ranging from 0-255).

A product vendor, a customer of a product vendor, or product designer may wish to generate a design, based on an image such as a photograph or graphic, which may be applied to a product, where the design incorporates one or more regions of premium finish. In more advanced applications, it may be desirable to allow a customer to upload an image to be converted to a design and to designate certain regions of the design (i.e., image segments) as premium finish regions. The premium finish regions are applied to the product via a separate process from the rest of the design. For example, the product may be a printed product such as a business card, and a customer may wish to have their company logo or customized text or even a photograph converted to design that includes foiled areas. The addition of foil to a printed design requires a printing process and a foiling process, which are separate processes. An example of a foiling process is stamping in which a metal plate engraved with an image of the areas to be foiled first strikes a foil film, causing the foil film to adhere to the engraved plate, and then strikes the substrate (e.g., business card) to transfer the foil to the desired areas of the design. Another foiling process is hot stamping (i.e., foil stamping with heat applied), while another type of foiling process involves applying adhesive ink in areas to be foiled, followed by application of a foil layer over the entire image, followed by foil removal, such that foil remains on the areas to which it adheres to the glue. Clearly, each foil process is a separate process from the printing process, and requires different input—namely the mask image indicating the areas for application of foil. Other types of premium finish also require different and separate processes. Embossment, for example, is typically performed by compressing a substrate (e.g., business card stock) between two die engraved with an image representing areas where the substrate is to be embossed—one die having raised areas where the image is to be embossed and the other having recessed areas where the image is to be embossed. Clearly, the embossment process is a completely separate process than the printing of the design on the substrate. In general, then, application of a premium finish requires separate processing from the application of the primary finish, and the premium finish processing utilizes the premium finish mask image as instruction of where the premium finish should be deposited/applied to the product.

When a premium finish design is to be generated based on an image, areas of the image must be mapped to discrete segments of the image. In one embodiment, the problem of separating the image into segments and then determining which segments to select for premium finish is treated at least in part by determining and separating background regions from foreground regions of the image. In order to handle all types of image content, the background/foreground separation is performed for the general case (i.e., distinguishing between content in the foreground versus a multicolor background), rather than only from a single-color background.

In a preferred embodiment, segments of the image are extracted by first smoothing the image using a smoothing filter 131 (see FIG. 2) that preserves strong edges yet removes small details by smoothing or removing weaker edges. In an embodiment, the smoothing filter 131 is implemented as a mean-shift filter, which is well-known in the art of image processing. Smoothing using a filter such as mean shift filtering is important because it removes less important edges, thereby reducing the number of segments that one might otherwise get after applying color segmentation to the original image. Instead, by applying the smoothing filter, the strong boundaries remain but the small detail is removed and weak edges are smoothed into areas of gradual color change. After subsequently applying color segmentation on the smoothed image, the resulting number of segments is reduced from what it would otherwise be, which makes segment selection more manageable.

The image smoothing filter 131 may be implemented using other edge-preserving smoothing techniques in place of mean shift filtering. For example, an anisotropic filter may be applied instead, to sharpen detected boundaries by smoothing only at angles oblique to the detected edges where strong edges are detected and to smooth in all directions in areas where no (or weak) edges are detected. It is possible that still other smoothing algorithms can be applied without departing from the scope of the invention so long as the stronger edges in the image are preserved and the resulting smoothed image operates to assist in the final segmentation to reduce the final number of color segments to a manageable number of segments (which can be independently selected or unselected) while simultaneously preserving significant image features.

Once the original image is smoothed by the smoothing filter 131, the image segmentation engine 132 (see FIG. 2) performs the final segmentation by processing the smoothed image into a color-segmented image. In an embodiment, the image segmentation engine is implemented as an image processor that performs a technique referred to as connected component labeling based on color proximity (can be in RGB, LAB or any other color space producing desired results). In connected component labeling, regions or "blobs" of similar pixels are identified using graph theory. In particular, subsets of connected pixels are identified and labeled as "connected" based on the formation of a set of graphs comprising a set of vertices and connecting edges. Connected component labeling is one technique for identifying and separating background detail from foreground detail in an image, and identifying and labeling foreground regions as selectable for premium finishing. Connected-component labeling is a well-known technique in computer visioning for extracting regions or blobs in an image.

Below is a section of pseudo-code that exemplifies one implementation of the image segmentation engine 132 based on connected component labeling based on color proximity:

First Pass: Pixel Labeling

```
Input: image with edge-preserving smoothing applied (2-dimensional array
colors[height, width])
Output: pixel label data (2-dimensional array labels[height, width])
process_image(in:colors, out:labels)
    current_label = 100                      //initialize label
    for y = 0 to height-1                    //loop through pixel rows
        for x = 0 to width-1                 //loop through pixel columns
            if labels[y, x] = 0 then         //if pixel is not labeled yet
                color = colors[y, x]         //remember the color of current pixel
                process_pixel(color, y, x, labels)   //process current pixel
                current_label++              //generate next label
            end
        end
    end
end
process_pixel(in:colors, in:color, in:y, in:x, in:current_label, in/out:labels)
    labels[y, x] = current_label  //label the current pixel with the current label
    //loop through all immediate neighbors of the current pixel
    for dy = -1 to +1
        for dx = -1 to +1
```

-continued

```
        neighbor_y = y + dy
        neighbor_x = x + dx
        if (neigbor_y, neighbor_x) is not current pixel (y, x) and not outside image
then
        neighbor_color = colors[y, x]
        if |color – neighbor color| < threshold then //check whether colors are
similar enough
            process_pixel(colors, color, neighbor_y, neighbor_x, current_label,
labels)      //recursively process the neighbor pixel
        end
      end
    end
end
```

Second Pass: Calculating Colors of Segments

```
Input: image with edge-preserving smoothing applied (2-dimensional
array colors[height, width])
Input: pixel label data (2-dimensional array labels[height, width])
Output: segmented image (2-dimensional array segments[height, width])
color_segments(in:colors, in:labels, out:segments)
  for each label
    for each pixel marked by that label, replace its color with a color
which is a simple average of all pixels with same label and record in the
segments array
  end
end
```

The result of the above algorithm is a segmented image labeled based on colors. Each segment comprises an exclusive subset of pixels set to the same color.

In an alternative embodiment, separation of the foreground regions from the background regions may be performed by one of several available tools, for example the "Remove Background" tool available in MS Office 2010, available from Microsoft Corporation, which implements a version of an algorithm referred to as the "Grab Cut" algorithm, which is described in detail in C. Rother, V. Kolmogorov, and A. Blake, "GrabCut: Interactive foreground extraction using iterated graph cuts", ACM Trans. Graph., vol. 23, pp. 309-314, 2004, and is hereby incorporated by reference for all that it teaches. Such products work well on photographic images but are not effective at detecting holes in the foreground and understanding that the holes are part of the background. This can be a problem when important areas of the image contain text: the amount of work required to remove holes from line-art type images is very large—one would need to unselect every hole inside each individual letter/character when text present, and this can be time-consuming. Furthermore, the currently available solutions are not very predictable: a small change in the position or size of the selection rectangle can cause abrupt changes in what gets removed (i.e., the algorithm is not local).

Other methods of performing color segmentation of the smoothed image may be applied in place of connected component labeling based on color proximity without departing from the scope of the invention. For example, in an alternative embodiment to separation of the foreground areas from the background areas of the image, it may instead be convenient to segment the areas of the image based on colors contained in the image itself. In general, a color segmented image is generated by iteratively merging pixel colors based on pixel color similarity and edge strength until the image contains only a predetermined number of colors or predetermined number of color segments. This process is known in the image processing art as "color reduction".

During a color reduction process, all of the pixels in the image are classified and set to the nearest one of a reduced number of colors. The reduced set of colors can be determined by iterative color merging, or by identifying the dominant or most frequently used colors in the image.

Upon production of a segmented image by the segment selection engine 133, segments are designated for application of premium finish. The selection of the set of segments designated for premium finish may vary depending on the particular use of the system. In one embodiment, as indicated at step 3a in FIG. 1, the system automatically selects one or more of the labeled segments and designates the selected segments for premium finish. There are multiple possible alternatives for choosing which segments to automatically select. In an embodiment, all foreground segments are automatically selected for premium finish. This can be achieved by automatically selecting a bounding box having a perimeter just inside (by one or a small few pixels) the outer edges of the image, and then assuming that any labeled segment which the bounding box overlaps is background and any labeled segment that is fully inside the bounding box (i.e., segments which the bounding box does not cross or overlap) is a foreground segment. Also, any segment having color similar (within a fixed threshold, for example) to the color of the background is classified as background. This can assist in identifying and classifying holes in the foreground segments as background as well; however, when the bounding box passes through multiple segments due to a multi-color background, determining holes becomes much more difficult and is typically not able to be done automatically.

Referring now to FIG. 4A, there is shown an exemplary original image 40, which is an image of content to be applied to business card stock to generate a business card product. FIG. 4B illustrates an exemplary corresponding smoothed image 41, and FIG. 4C shows the corresponding color-segmented image 42 resulting from color segmentation of the smoothed image of FIG. 4B. FIG. 4D illustrates a highlighted image 43 showing the image 40 with a bounding box 44 near the edges that selects the entirety of the image content (less the outermost one to few rows/columns of pixels of content—see exploded view at 44a). As illustrated, since the bounding box 44 overlaps segment S0, segment S0 is thus identified as a background segment. All segments having a similar color (within a fixed threshold, for example) as segment S0 are also identified as background. For example, segment S2, corresponding to the hole inside the letter "A" is identified as background. It will be noted that many applications of the present invention will be to manufacturing products by applying designs that include text. Therefore, hole detection may be very important to automating the mask generation for premium finishes. Accordingly, additional techniques for ensuring accurate segmentation may be applied. Segments which correspond to text (and corresponding holes contained in the text) can be detected, for example using the methods and systems described in patent publication US20130044945 A1 published Feb. 21, 2013 and entitled "Method and System for Detecting Text in Raster Images" (filed as U.S. patent application Ser. No. 13/210,184 on Aug. 15, 2011), which is hereby incorporated by reference herein for all that it teaches. All remaining segments that are not identified as background are designated as foreground segments. Since all foreground segments fully contained within the bounding box 44 are automatically selected for premium finish, they are highlighted in FIG. 4D to indicate they are selected. It will be noted that FIG. 4D (i.e., the highlighted version of FIG. 4A highlighting the areas designated for premium finish) is shown herein merely for instructive purposes in demonstrating how the segments are selected relative to the bounding box 44. It will be noted, however, that image 43 is not likely to be generated as such in practice, as the bounding box 44 and the segment selections will generally be represented in the system as a data structure or programmed equation or other internal representations stored in memory.

FIG. 4E is a gradient image 45 of the selected segments, which, as discussed hereinafter indicates how well the selected segments correspond to areas with strong edges in the original image. FIG. 4F illustrates a binary mask image 46 corresponding to the segments of FIG. 4C fully contained within the bounding box 44.

For some systems, selecting the entire foreground portion of the image for premium finish may be what is desired. In other systems, however, premium finish is used more for highlighting certain features in the image, and thus it would not be appropriate and/or desired to apply premium finish to the entirety of the foreground regions of the image. One of the goals of the systems, methods and tools presented herein is to make premium finish mask creation as simple as possible for both designers and end-user customers of products incorporating applied designs. According to one aspect, this is achieved by simply automating the selection of the segments for premium finish. However, should it be desired to select less than the entire foreground content of the image, the determination of the segments to be premium finished can be quite difficult due to the amount of detail in most photographic images. Accordingly, in some embodiments, as indicated in step 3b of FIG. 1, one or more user tools may be provided to allow a user of the system to individually and/or group-wise select/deselect segments of the image for designation as premium finish. Thus, it is useful to a designer or end-customer to have available simple intuitive segment selection tools to hand touch (i.e., select and/or deselect) segments for designation as premium finish. Accordingly, in some embodiments, the system may include User Selection/Deselection Tool(s) 135 (see FIG. 2).

Figure 4G:
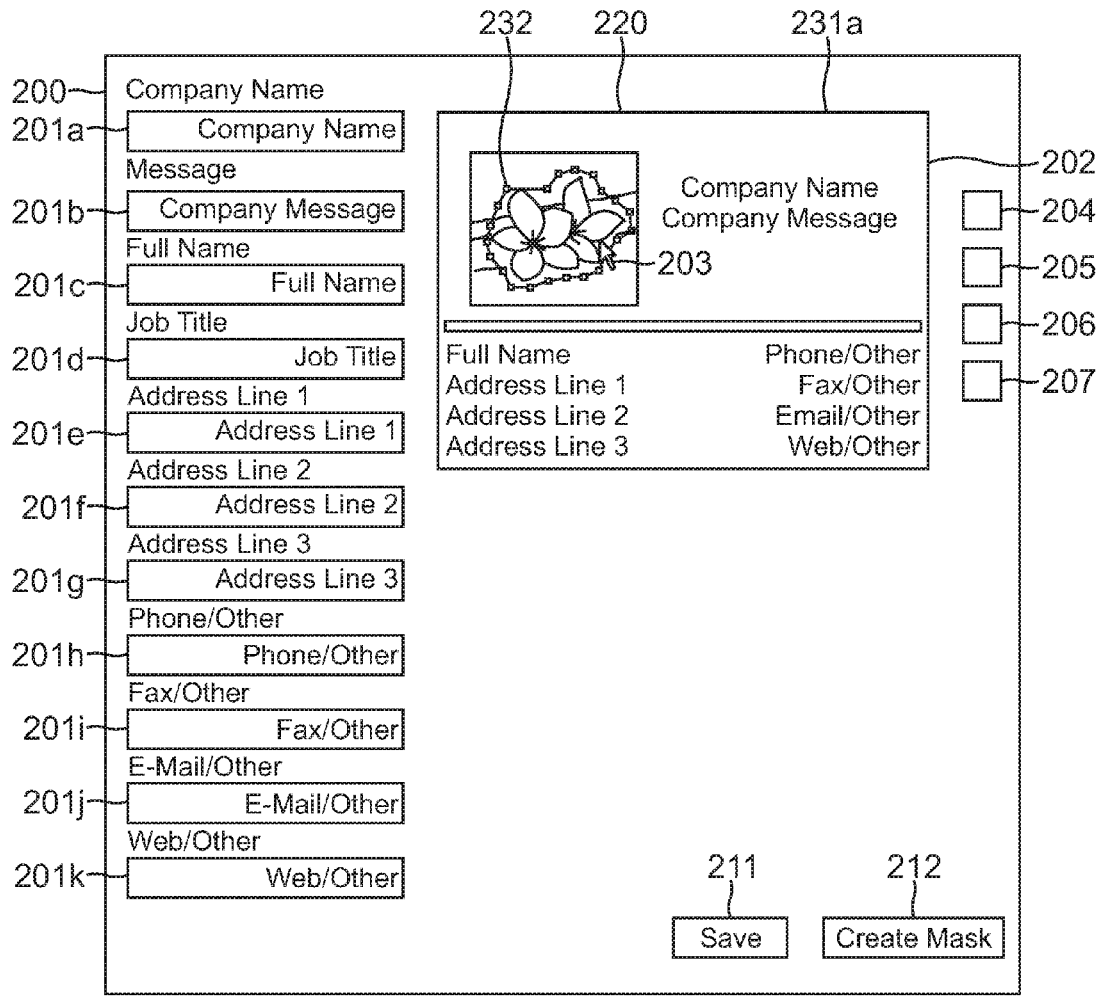
FIG. 4G is an exemplary graphical user interface illustrating a customizable design template for creating the design of the image of FIG. 4A and the use of a FreeForm selection tool.

In an embodiment the system and method includes tools and steps for exposing user tools on a user's (i.e., designer's or customer's) display on a client computer system 110 (step 3b in FIG. 1). FIG. 4G shows an example graphical user interface 200 presented to a user during design of the business card product that is represented by the image 40 of FIG. 4A. The graphical user interface 200 includes a work area 202 which displays the current design. The design in the example includes text corresponding to user-editable content in user input boxes 201a-201k reciting a company name 201a, a company message 201b, a name 201c, a job title 201d, address lines 1, 2 and 3 (201e, 201f, 201g), a phone number 201h, a fax number 201i, an email address 201j, and a company website URL (uniform resource locator) 201k. The design also includes an image 220, which may be a digital photograph, a line art image, a graphical image, etc. In an embodiment, the design displayed in the work area 202 is at least partially a What-You-See-Is-What-You-Get (WYSIWYG) display in terms of the content, placement, fonts, colors, of the content. However, since it is difficult to accurately represent premium finishes such as foil, gloss, and other shiny or textured material on a computer display screen due to the scattering of light on such surfaces, the areas of the image designated for premium finish do not appear as premium finish in the work area 202. Optionally, a full rendering of the design in the work area with simulation of light across the selected areas of premium finish may be generated and displayed as a preview image 210a to give the user an accurate depiction of how the final product will appear when physically manufactured. One way for simulating a preview image of the finished product with premium finish applied is described in detail in U.S. patent application Ser. No. 13/210,184, filed Aug. 15, 2011, and entitled "Method and System for Detecting Text in Raster Images", and is incorporated by reference herein for all that it teaches.

The graphical user interface 200 may include one or more user tools 204, 205, 206 to individually select and/or deselect segments of the design (including segments of the image contained in image container 220) to include the user-selected segments or exclude the user-deselected segments from the set of segments designated for premium finish.

Figure 4H:
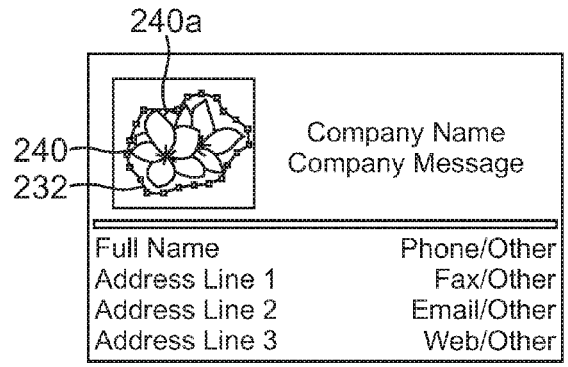
FIG. 4H is a gradient image of the design image corresponding to the selected segments as selected in FIG. 4G.

In the illustrative embodiment, the user segment selection/deselection tools include a Rectangle Selection tool 204, a FreeForm Selection tool 205, and a Selection/Deselection marker tool 206. FIGS. 4G, 4J and 4M together illustrate the use of user tools to select and fine-tune a premium finish selection.

In FIG. 4G, the user has selected the FreeForm tool 205 (shown as highlighted) to draw, using the cursor 203, a FreeForm selection shape 232 circumscribing a portion of the image contained in the image container 220. In an embodiment, the FreeForm selection shape 232 instructs the system to select all segments in the corresponding segmented image (FIG. 4C) that are fully contained within the footprint of the FreeForm selection shape 232. FIG. 4H is a gradient image with the selected segments 240 highlighted and with the FreeForm selection shape 232 overlaid.

The FreeForm drawing may not always allow the level of accuracy that a user intends. For example, due to low resolution of the match of cursor movement to pixel position, it may be that occasionally some segments that the user does not intend to premium finish get unintentionally selected. For example, as illustrated in the gradient image in FIG. 4H, the selected segments, as indicated by the highlighted portion 240, include portions 240a of the image background surrounding the flower petals. However, it is likely that the user intended to premium finish only the "flower petals" content in the image. For this reason, the user tools may also include a fine-tune Selection/Deselection marker tool 206 which allows a user to mark small areas for deselection and/or selection.

Figure 4I:
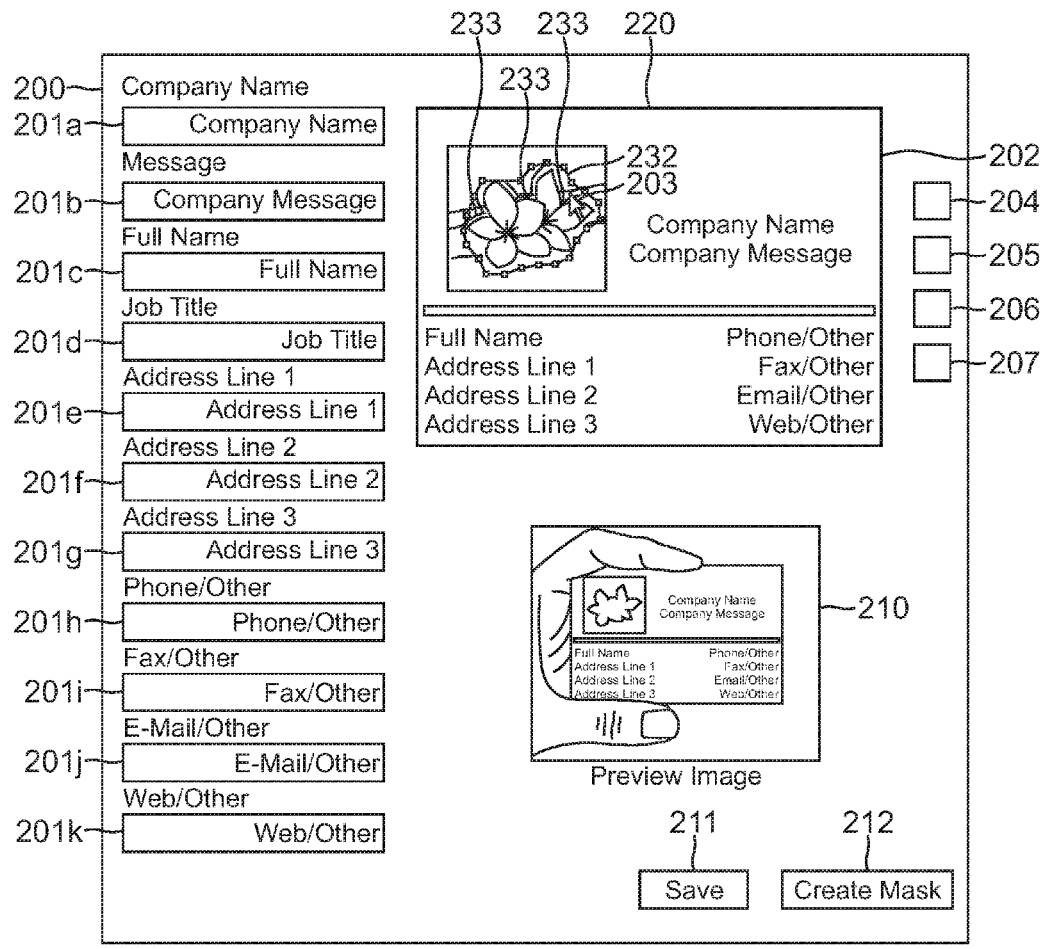
FIG. 4I is the graphical user interface of FIG. 8G illustrating the use of the Selection/Deselection marking tool.
Figure 4J:
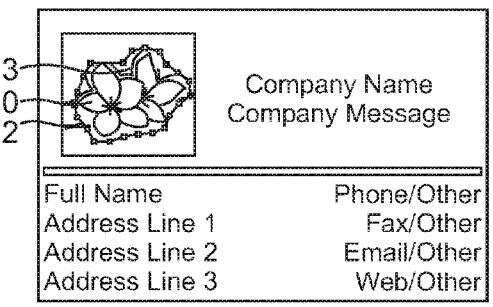
FIG. 4J is a gradient image of the design image corresponding to the selected segments as selected in FIG. 4I.

In FIG. 4I, the user has selected the Selection/Deselection marker tool 206 (shown as highlighted) to mark areas 233 inside the FreeForm selection area 232 to indicate that such areas are background areas and not to be included in the premium finish selection. As illustrated, the gradient image, shown in FIG. 4J, has been updated to show that only the "flower petal" portions are highlighted, indicating that only the segments corresponding to the "flower petal" portions are designated for premium finish.

Figure 4K:
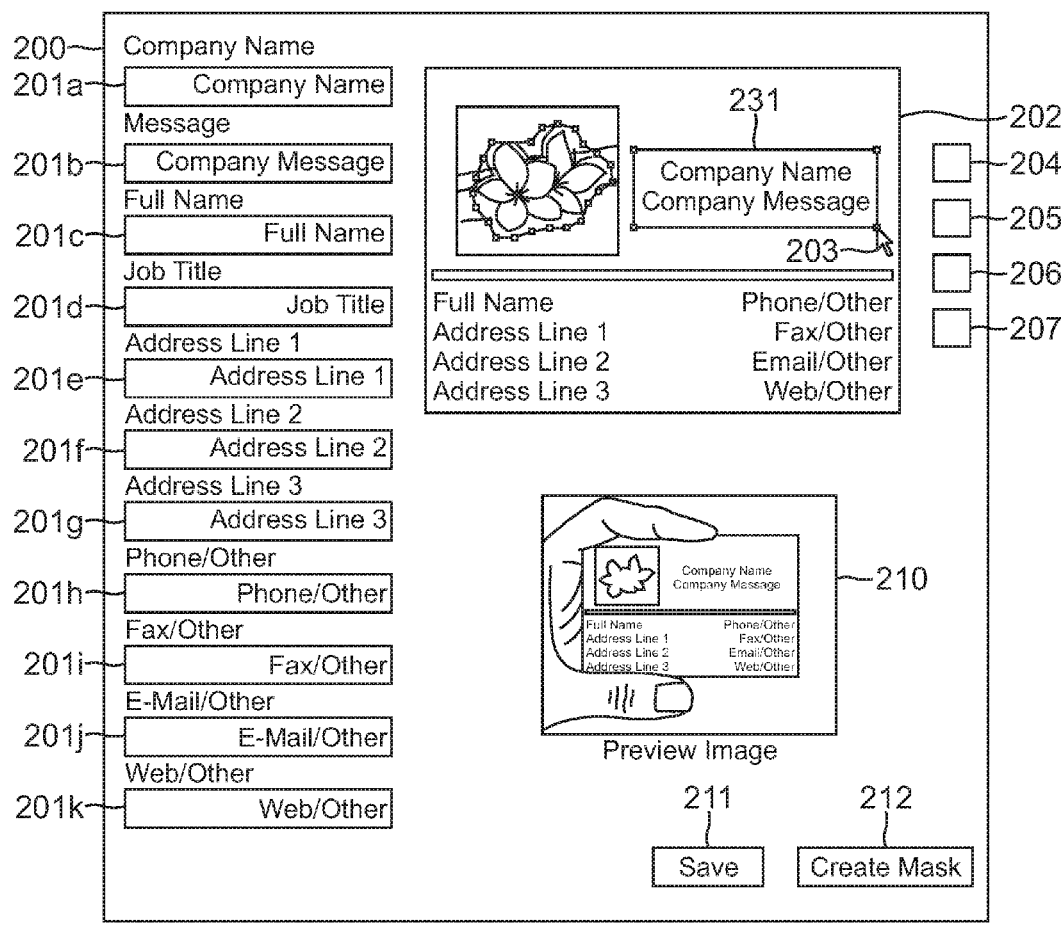
FIG. 4K is the graphical user interface of FIGS. 4G and 4I illustrating the use of a Rectangle selection tool.

FIG. 4K illustrates the use of the Rectangle selection tool 204. In FIG. 4K the user has used a mouse to select the Rectangle selection tool 204 (shown as highlighted) to draw, using cursor 203, a selection rectangle 231 around portions of the text to indicate that the selected text is to be included in the premium finish selection. As illustrated, the gradient image, shown in FIG. 4L, has been updated to show that the "flower petal" segments and the text circumscribed by the selection Rectangle 231 are highlighted and are designated for premium finish.

When the user is satisfied with the premium finish selection, the user can save the design by clicking the save button 211 using the cursor 203. Furthermore, the user can instruct the system to generate a premium finish mask corresponding to the design by clicking on the Create Mask button 212 using the cursor 203. Alternatively, the mask creation may be performed automatically by the system when the user saves the design. FIG. 4M shows an example premium finish mask (i.e., a binary image) generated by the system which corresponds to the final design shown in FIG. 4K.

It is to be noted that the selection Rectangle 231, the selection FreeForm shape 232, and the selection/deselection markers 232, are not part of the design itself but are rendered on the user's display on a separate layer over the rendered design in work area 202 merely to allow the user to view where the user has placed the selection areas. In implementation, once a portion (or all) of the image is selected by a selection Rectangle or a selection FreeForm shape, the system analyzes the boundary of the selection shape and only selects segments, based on the color-segmented version (FIG. 3C) of the original image, which are fully inside the contour of the selection This can be performed by first selecting all segments having any portion within the boundaries for the selection shape, and then determining and deselecting each segment that has a pixel that corresponds to the position of any pixel of the selection boundary in the selection boundary layer. A similar process can be performed for the selection/deselection indicators 232—determining and selecting/deselecting each segment that has a pixel that corresponds to the position of any pixel of the corresponding selection/deselection indicators 232.

In general, the selection engine operates to select for premium finish all segments within selection area bounded by a selection boundary. In embodiments which perform automatic selection of the entire foreground, for example in systems where user tools may not be offered, the automatic selection is achieved by automatically setting the selection area boundary to the outer pixels (or near the outer edges) of the image, as illustrated at 44a in FIG. 4D. Embodiments which allow group-wise segment selection by the user via one or more area selection tools in a graphical user interface such as illustrated in FIGS. 4G, 4I and 4K, the selection area is the area of the image inside the selection tool boundaries (e.g., the selection Rectangle, the selection FreeForm shape). That is, when an area of the image is selected for premium finish, the system assumes that the boundary of the area selector (e.g., the automatically placed Boundary Box 44, the Selection Rectangle box 231, the FreeForm selection shape 232) is drawn over/through background portions of the image—therefore, the remaining segments inside the boundaries of the area selector(s) are considered to be foreground and is/are therefore designated as selected for premium finish. Embodiments which allow fine-tuning of segment selection via one or more area selection tools such as the Selection/Deselection marker tool 206 in a graphical user interface such as illustrated in FIG. 4I, any segment that has any pixel that corresponds to the position of any pixel of a selection mark (made by the Selection/Deselection marker tool 206) is selected, and any segment that has any pixel that corresponds to the position of any pixel of a deselection mark (made by the tool 206) is deselected (or conversely selected if already deselected).

Important to the ease of use of the present invention is that the segments automatically selected for premium finish accurately and aesthetically reflect what the user or other human would believe is a desirable and pleasing application of the premium finish. In other words, is the premium finish on the final product going to be applied in areas that enhance the overall appearance of the design, and does it make sense to an average consumer of the product?

In this regard, in a preferred embodiment, the system 100, and in particular the premium finish mask generation tool 130, includes a selection confidence calculator 134 (see FIG. 2). One of the goals of the systems, methods and tools presented herein is to ensure that the premium finish mask created for a particular image will result in an aesthetically pleasing design that accurately reflects what the designer or customer does or would intend. That is, when a certain area or all of an image is selected, either automatically or manually by a designer or customer, it is important that the segments selected by the system are actually the segments that the designer or customer actually does or would intend to finish with a premium finish.

The system is thus preferably equipped with a selection confidence calculator 134 which calculates a value that corresponds to a level of confidence that corresponds well to a human judgment about the quality of the selection of segments understood by the system as selected for premium finish. In an embodiment, the selection confidence calculator 134 generates a number (for example, but not by way of limitation, in the range [0..1]), referred to herein as the "Selection Confidence", which in one embodiment reflects the degree of separation of foreground from background. In an embodiment, after the segmented image is generated, the selection confidence calculator 134 calculates the gradient of the original image (FIG. 4A) and the final selected segments (FIG. 4K) and calculates a color gradient match along the contours separating selected segments from non-selected segments. In general, if the gradient match along the contours separating selected segments from the non-selected segments is, for the most part, high, this indicates that the particular contour representing a transition between premium finish and non-premium finish follows along strong edges in the original image, which is a strong indicator that the selected segment is intended to be selected—that is, the Selection Confidence would be high. Conversely, if the gradient match along the contours separating selected segments from the non-selected segments is for the most part low, this indicates that the particular contour representing a transition between premium finish and non-premium finish follows a path through smooth areas or along weak edges in the original image, and the Selection Confidence would therefore be low, indicating that one or more selected segments are not likely to be intended for selection.

The human eye is sensitive to image features such as edges. In image processing (by computers), image features are most easily extracted by computing the image gradient. The gradient between two pixels represents how quickly the color is changing and includes a magnitude component and a directional component. For a grayscale image of size M×N, each pixel at coordinate (x, y), where x ranges from [0..M−1] and y ranges from 0 to N−1, defined by a function f(x, y), the gradient of f at coordinates (x, y) is defined as the two-dimensional column vector $$\nabla f = \begin{bmatrix} G_x \\ G_y \end{bmatrix} = \begin{bmatrix} \frac{\partial f}{\partial x} \\ \frac{\partial f}{\partial y} \end{bmatrix}.$$

The magnitude of the vector is defined as:

$$\nabla f = mag(\nabla f) = [G_x^2 + G_y^2]^{1/2} = \left[ \left( \frac{\partial f}{\partial x} \right)^2 + \left( \frac{\partial f}{\partial y} \right)^2 \right]^{1/2}.$$

For a color image of size M×N, each pixel at coordinate (x, y) is defined by a vector having a Red component value R(x, y), a Green component value G(x, y), and a Blue component value B(x, y). The pixel can be notated by a vector of color components as:

$$c(x, y) = \begin{bmatrix} R(x, y) \\ G(x, y) \\ B(x, y) \end{bmatrix}.$$

Defining r, g, and b as unit vectors along the R, G, and B axis of the RGB color space, we can define the vectors $$u = \frac{\partial R}{\partial x} r = \frac{\partial G}{\partial x} g + \frac{\partial B}{\partial x} b \text{ and}$$

$$v = \frac{\partial R}{\partial y} r = \frac{\partial G}{\partial y} g + \frac{\partial B}{\partial y} b$$

and then define the terms $g_{xx}$, $g_{yy}$, and $g_{xy}$ in terms of the dot product of these vectors, as follows:

$$g_{xx} = u \cdot u = \left| \frac{\partial R}{\partial x} \right|^2 + \left| \frac{\partial G}{\partial x} \right|^2 + \left| \frac{\partial B}{\partial x} \right|^2$$

$$g_{yy} = v \cdot v = \left| \frac{\partial R}{\partial y} \right|^2 + \left| \frac{\partial G}{\partial y} \right|^2 + \left| \frac{\partial B}{\partial y} \right|^2$$

$$g_{xy} = u \cdot v = \frac{\partial R}{\partial x} \frac{\partial R}{\partial y} + \frac{\partial G}{\partial x} \frac{\partial G}{\partial y} + \frac{\partial B}{\partial x} \frac{\partial B}{\partial y}$$

The direction of the gradient of the vector C at any point (x, y), is given by:

$$\theta = \frac{1}{2} \tan^{-1} \left[ \frac{2 g_{xy}}{g_{xx} - g_{yy}} \right]$$

and the magnitude of the rate of change at (x,y), in the direction of θ, is given by:

$$F(\theta) = \left\{ \frac{1}{2} [(g_{xx} + g_{yy}) + (g_{xx} - g_{yy}) \cos 2\theta + 2 g_{xy} \sin 2\theta] \right\}^{1/2}.$$

Figure 5A:
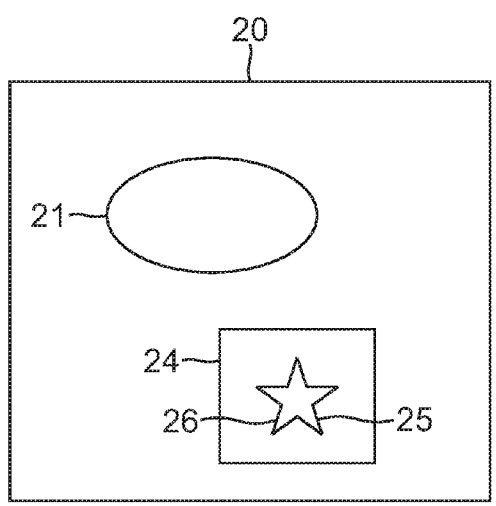
FIG. 5A is a simple example of an original image.
Figure 5B:
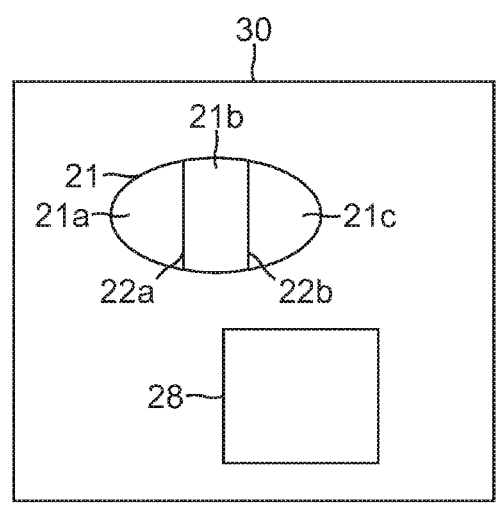
FIG. 5B is a corresponding color-segmented image of the original image of FIG. 5A, illustrating introduction of new edges and disappearance of original edges resulting from color-segmentation.

FIGS. 5A and 5B provide a simple illustration of how gradient matching can be used to determine segment selection confidence. FIG. 5A shows a region 21 of an image having a color that gradually changes across the region (e.g., from left to center and from center to right). Since the color transition is smooth and gradual, there are no visible edge features between the left, center, and right portions of the region 21. When color segmentation is performed, however, as illustrated in FIG. 5B, the far left and far right portions 21a, 21c of the region 21 may be classified as a different color than the center portion 21b of the region. Pixels falling within the region 21 will be classified one way or another according to color range thresholds. Pixels at the far left 21a and far right 21c of the region 21 have a color value which falls within the range of a first color and are therefore classified as, and set to, the first color. Pixels closer to the center portion 21b of the region 21 have a color which falls within the range of a second color and are therefore classified as, and set to, the second color. The classification of all pixels in the region 21 into only two (or a small few) discrete colors therefore results in the fracturing of continuous color transitions into two or more discrete colored regions, introducing (i.e., inducing) new edges 22a, 22b that were not present in the original image.

When the gradient is calculated across the image 30, the newly introduced edges 22a and 22b are easily detectable. A comparison of the gradient calculated across image 20 and across image 30 will reveal the newly introduced edges 22a, 22b and this information can be used to inform the Selection Confidence calculator 134 that the selection of one or the other (but not both) of the segments 21a and 21b may result in an undesired premium finish result. That is, if one or the other of the segments 21a and 21b is selected for premium finish, the premium finish will only serve to highlight the newly introduce edge(s) 21a, 21b which did not exist in the original image. This can adversely affect the aesthetics of the finished product.

Color segmentation can also result in the elimination of original boundaries. For example, referring again to FIG. 5A, an image may have one or more regions 24, 25 of different colors, separated by distinct boundaries or edges 26. The different colors of the regions 24 and 25, however, may each fall within a color range which maps to the same single color for purposes of color reduction. In this case, as shown in FIG. 5B, the sub-regions 24 and 25 are reduced to a single mono-color region 28, eliminating the original boundary 26 (see FIG. 5A) dividing them. Depending on how significant the eliminated feature was, this may or may not be acceptable in the final appearance of the embroidered image. In this case, if the segment 28 is selected for premium finish, then the entire region including the region 25 which was originally distinguished via original edges 26, will be finished with premium finish. Thus, the shape 25 may disappear in the final product, especially if the premium finish is applied on top of the primary finish. Again, gradient match can be used to detect such a condition. In this case, it is the original image which contains edges that do not appear in the segmented image. Calculating the pixel match across the selected segments between the original image and the selected segment image will reveal lost edges.

Figure 4L:
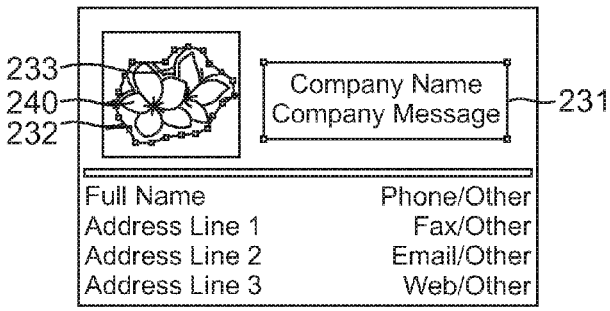
FIG. 4L is a gradient image of the design image corresponding to the selected segments as selected in FIG. 4K.
Figure 4M:
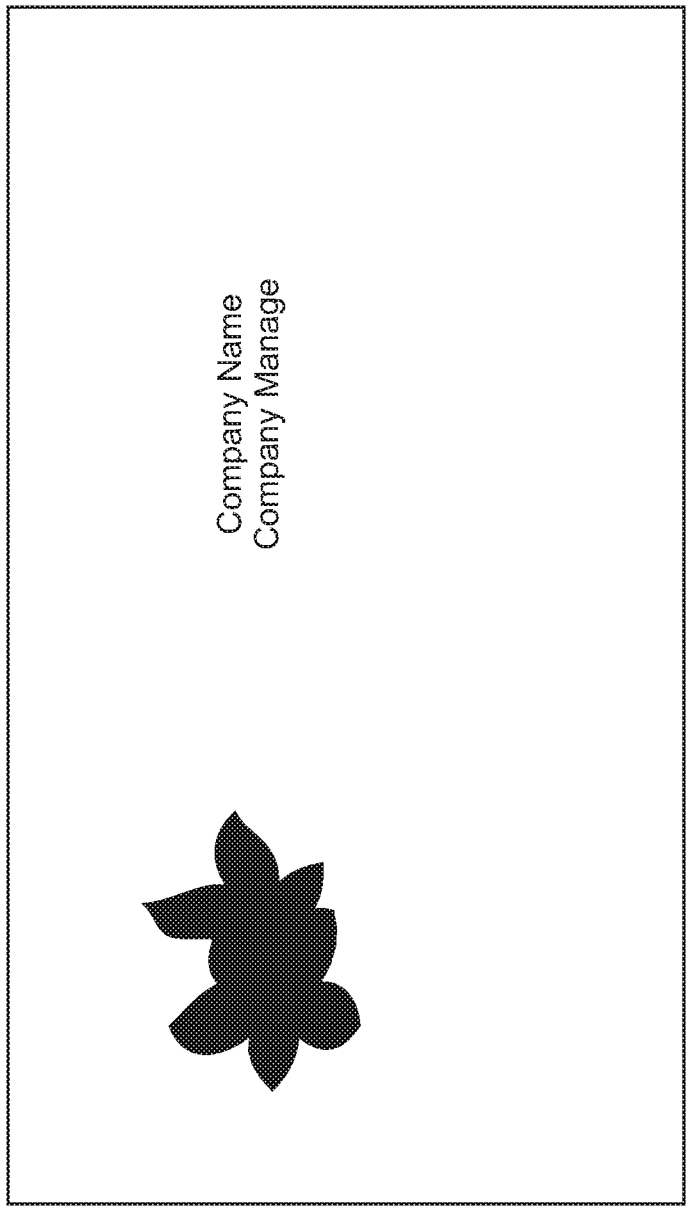
FIG. 4M is an example binary mask image created based on the selected segments of FIG. 4L.

Referring now to FIG. 4L, this image shows the gradient image of the segmented image with final segment selections of FIG. 4K. (Note: the highlights are not included in the actual gradient image and are included only for purposes of indicating which segments are selected.) As illustrated, (1) pixels in regions of constant color value map to a zero value in the gradient image (and hence the corresponding gradient pixel is completely dark), (2) pixels corresponding to the onset of a color value step (i.e., an edge) or ramp map to non-zero values in the gradient image, and (3) pixels corresponding to areas of color transition (i.e., more gradual color change) map to proportional non-zero values in the gradient image.

The gradient image of the original image of FIG. 4A is also generated/calculated (but not shown herein), and the pixel values of the original image gradient and the selected segment gradient are pixel-wise compared along the contours between the selected and non-selected segments. The more differences there are between the corresponding pixels, the lower the gradient match along these contours, and the lower the Selection Confidence value. In general, it has been found that a gradient match of at least approximately 90% is desirable when tested against human judgment. When a threshold is used to filter high confidence selections from low confidence selections, an image passes a confidence test (or returns a relatively high Selection Confidence value) when the gradient match is above the gradient match threshold, and conversely fails the confidence test (or returns a relatively low Selection Confidence value) when the gradient match is below the gradient match threshold. For example, if there is a 95% match in pixel values along the contours between selected and non-selected segments between the gradient of the original image and the gradient image of the selected segment image (FIG. 4K), and the threshold is set to 90%, then the image passes the selection confidence test. If, however, the threshold is set to 98%, then the selection would fail the selection confidence test.

Figure 6:
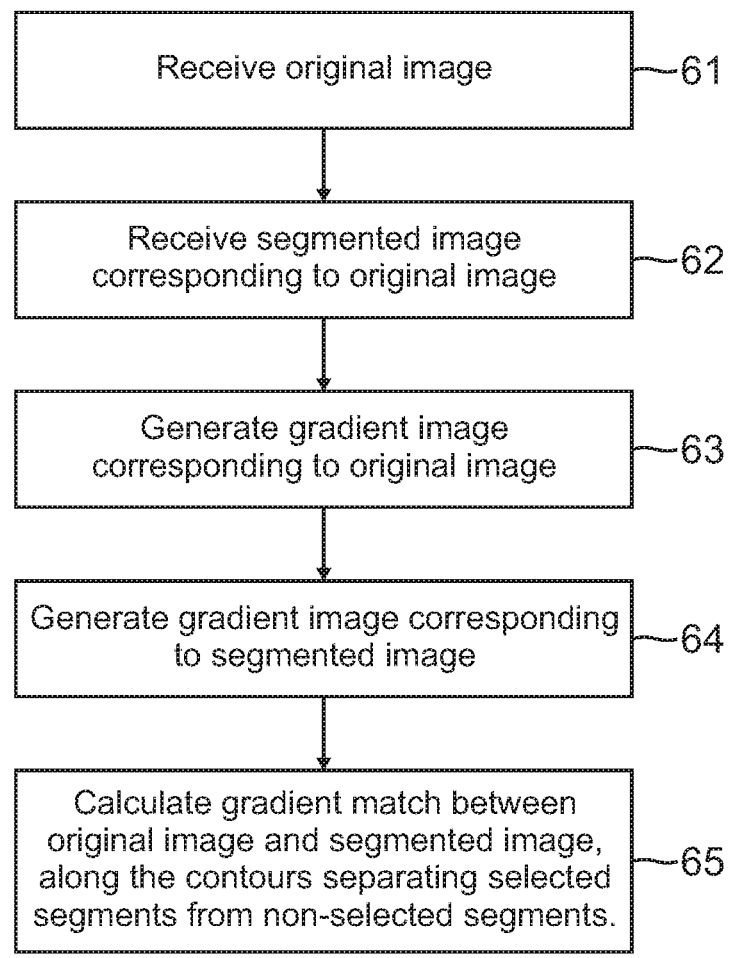
FIG. 6 is a flowchart illustrating an exemplary method for determining a confidence level for an associated segment selection.

FIG. 6 shows an example methodology followed by an exemplary Selection Confidence calculator 130. As illustrated, the Selection Confidence calculator 130 receives the original image (step 61) and the segmented image (step 62). The Selection Confidence calculator 130 generates a gradient image corresponding to each of the original image and the segmented image is generated (i.e., gradient original image (step 63) and a gradient segmented image (step 64)). The Selection Confidence calculator 130 compares the selection area (i.e., the pixels corresponding to pixels inside the bounding box, selection Rectangle, selection FreeForm shape, etc.) of the gradient original image to the gradient segmented image (step 65) to calculate how well the gradients corresponding to the contours between selected and non-selected segments in the segmented image match the gradients of the corresponding areas in the original image. In an embodiment, each pixel in the selection area of the gradient original image is compared to its corresponding pixel in the gradient segmented image, keeping track of the number of pixels that have differing values. The gradient match is the number of matching pixels over the total number of pixels in the selection area. The Selection Confidence calculator 130 generates a Selection Confidence value corresponding to the calculated gradient match in the selection area. The Selection Confidence value represents how confident one might be that the selected set of segments in the selection area correspond well to corresponding areas in the selection area of the original design.

Returning to FIG. 1, once the Selection Confidence is determined in step 8a, it is evaluated against a minimum confidence threshold in step 8b. As discussed above, the minimum confidence threshold may be set by the system designers, but is generally preferred to be at least 90% in order to ensure close match between the selected segments and corresponding areas of the original image. In an embodiment, the Selection Confidence is used to determine whether or not to present a preview image of the finished product (step 9).

In an embodiment, in optional step 10a the design image and segment selections associated with the original design are sent to a human reviewer who will take a look at the selected segments, and touch up the selected segments in the case that the system-generated segment selection over-included or under-included segments for premium finish. For example, the segmentation may include small detailed segments that the user would not be aware of and which may inadvertently get included in the selection area and be considered foreground segment. While it would be difficult for a computerized system to recognize that such a segment should not be included for premium finish, a human reviewer would easily recognize that such segment(s) are not part of the foreground image and can remove the selection of such segments.

Step 10a may be performed only when the Confidence Selection does not meet the minimum confidence threshold, or may alternatively be performed even when the Confidence Selection meets the threshold.

In an embodiment, it may be desired to present a preview image of the finished product, for example using the techniques described in U.S. patent application Ser. No. 13/973,396, filed Aug. 22, 2013, and entitled "Methods and Systems for Simulating Areas of Texture of Physical Product on Electronic Display", and is incorporated by reference herein for all that it teaches, in order to show the user/designer what the final product will look like with the premium finish applied.

In a system which sends designs and segment selections to a human reviewer for final touchup, and especially in cases where the Selection Confidence is below the minimum confidence threshold such that the human reviewer would be likely to make noticeable changes to the set of segments selected for premium finish, it may not be desirable to display a preview image in such cases. Thus, in an embodiment, a preview image of the finished product is displayed (step 9) only when the Selection Confidence value meets or exceeds the minimum confidence threshold (for example, 90% gradient match). If such embodiment, if the Selection Confidence value does not meet the threshold, the preview image is not displayed.

In yet another embodiment, if the Selection Confidence value meets or exceeds the minimum confidence threshold, for example when the minimum confidence threshold is set to a high value (such as, for example and not limitation, 98%), the human review in step 10a may be skipped.

Once the segments designated for premium finish are selected and finalized, the system generates a mask image indicating the selected segments (step 4). In this regard, in an embodiment a mask image is generated from a design image based on the segment selections. In an embodiment, in the corresponding mask image, pixels corresponding to the selected segments of the received image are set to a first predetermined RGBA (RGB plus Alpha) value, while pixels corresponding to the remaining portions of the image are set to a different predetermined RGBA value. In an embodiment, pixels corresponding to premium finish segments are set to a White RGB value, whereas pixels corresponding to non-premium finish segments are set to a Black RGB value. Other mask file formats and other color schemes may alternatively be used.

Optionally, the original design image and corresponding mask image, and optionally the segmented image from which the mask image is generated, are passed to a human reviewer for a final review prior to manufacture of the design on a product. For example, in a production environment, members of a human production support staff may review designs and corresponding masks prior to manufacture to ensure that the mask image enhances areas which make sense using human judgment and does not enhance areas of the image that would not make sense. If the human reviewer judges that automatically generated mask image indicates areas of premium finish that do not make sense based on the original image, or does not include areas indicated for premium finish that the human judges should be included in the premium finish, the human reviewer may touch up the mask image by adding or removing areas indicated for premium finish (step 10b).

In application, the image itself, or a design based on the image, is manufactured on a product (step 5). In the illustrative embodiment shown in FIGS. 4A-4K, the image is a business card design and the business card design is manufactured on card stock to create a set of business cards. In an embodiment, the primary finish is ink printed on the card stock. In an embodiment, the premium finish is foil, gloss, raised (3-dimensional) print, etc.

The order that the primary finish and premium finish is applied can vary depending on the desired finished effect. In one embodiment, the design is applied using the primary finish first (step 6a) and then premium finish is applied to areas of the product as indicated in the mask image (step 7a). In an alternative embodiment, the premium finish is applied first (step 6b)—the mask image used in the application of premium finish to the manufactured product in areas of the card stock as indicated by the mask image. The primary finish is applied second (step 7b)—in the illustrative embodiment, for example, the design (as indicated in the design image) is then printed on the card stock (such that ink may be printed over the premium finish). It is to be noted that the segments designated as premium finish as described herein may be designated as such only for the purposes of premium finish mask generation. In general, the original design image will still be finished in full using the primary finish, whereas the premium finish will be applied only in areas indicated by the mask image. For example, in the embodiment illustrated in FIGS. 4A-4K, the business card design is printed in full on the business card stock, and the premium finish areas (e.g., foil) is applied only in the areas indicated in the corresponding mask image. The design may be printed after first applying the premium finish so that portions of the printed design image appear on top of the premium finish. Likewise, it is possible that for some more transparent premium finishes, the printed design is printed before applying the premium finish and portions of the printed design appear through the premium finish. In other words, the segments designated for premium finish need not be, but can be, mutually exclusive of the segments not designated for premium finish.

The method disclosed in FIG. 1 can be performed for one of several reasons. First, a user of the system may have actively initiated the method by, for example, requesting a premium finish product and providing or selecting the original image. In this use case, the user may desire that the system automatically select the segments to be coated with premium finish, in which case the system 100 automatically selects all foreground segments of the image for premium finish.

In a second use case, the user actively requests a premium finish product and provides or selects the original image, but in this use case the user is provided with a set of user tools (step 3b) to allow the user to select one or more areas of the design in which premium finish is desired by the user. In this use case, the system must detect the user's selection and decode the user's selection to identify the segments of the image on which to base the premium finish mask image. In this use case, the Selection Confidence may be calculated (step 8a) to ensure that the selected segments make sense according to human judgment given the original image, and if the threshold is met, the mask is automatically generated, and otherwise the image and segment selection and/or mask image is sent to a human reviewer for touch-up (step 10a and/or 10b).

In a third use case, the user may provide a design image which is desired to be applied to a physical product, and the system then automatically segments the image, automatically selects segments for designation as premium finish (step 3b), and a selection confidence engine calculates the Selection Confidence (step 8a). Then, if the Selection Confidence value meets or exceeds a minimum confidence level (step 8b), a preview image of the design with premium finish applied according to the automatically selected segments, is generated and shown to the user (step 9) and a product upgrade to a premium finished version of the product is offered to the user (step 11)—namely, the same product designed by the user but enhanced with the application of premium finish. If the user accepts the offer (determined in step 12), the method continues as described.

It will be appreciated from the above discussion that the systems, methods and tools described herein allow a simple efficient way to quickly generate a mask image indicating premium finish areas of a product to be manufactured. While embodiments are described in the context of manufacturing mask images for applying premium finish (such as foil, gloss, or other separately applied texture) to a business card or other printed product, the invention is not so limited. The principles described herein may be applied to the manufacture of any product that requires a separate mask image for the application of a second finish to a physical product.

Those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

What is claimed is:

1. A system for generating by a computer system a premium finish mask image for applying a secondary finish to a product to be finished with a primary finish, the system comprising:

one or more processors configured to receive an image comprising a plurality of pixels, generate from the received image a segmented image having a plurality of pixels corresponding to the respective plurality of pixels of the received image, the segmented image comprising discrete segments each comprising a subset of pixels, receive a selection of segments of the segmented image, the selection of segments designated for premium finish, and automatically generate a mask image corresponding to the received image, the mask image having first areas indicating non-premium finish areas and second areas indicating premium finish areas, the premium finish areas corresponding to the selection of segments designated for premium finish.

2. The system of claim 1, wherein the image is a photographic image.

3. The system of claim 1, the one or more processors further configured to manufacture a design containing the image on a product, the manufacturing comprising applying the design image using a primary finish and applying premium finish in areas indicated by the mask image.

4. The system of claim 1, wherein the one or more processors generate the segmented image by
smoothing the received image while preserving strong edges, and
generating a color-segmented image from the smoothed image through extraction of segment labels based on color.

5. The system of claim 4, wherein the one or more processors smooth the received image by applying mean-shift filtering to the received image to generate the smoothed image.

6. The system of claim 5, wherein the color-segmented image is generated by applying connected component labeling to the smoothed image based on color proximity.

7. The system of claim 1, wherein the one or more processors smooth the received image by applying mean-shift filtering to the received image to generate the smoothed image.

8. The system of claim 1, wherein the one or more processors receive the selection of segments designated for premium finish by
separating the segments of the color-segmented image into foreground segments and background segments, and
automatically selecting all the foreground segments for designation as premium finish.

9. The system of claim 8, wherein the one or more processors receive the selection of segments designated for premium finish by
receiving a selection area of the image,
identifying foreground segments fully contained within the selection area of the image, and
automatically selecting all the identified foreground segments within the selection area of the image for designation as premium finish.

10. The system of claim 9, the one or more processors further configured to expose user tools to allow a user to select the selection area of the image.

11. The system of claim 8, the one or more processors further configured to determine a confidence level associated with the automatic selection, and indicate the confidence level.

12. The system of claim 11, wherein the confidence level is determined based on a gradient match between corresponding areas in the received image and in the segmented image, the corresponding areas comprising at least pixels mapping to segment contours separating the selected segments from non-selected segments.

13. The system of claim 11, wherein if the confidence level meets or exceeds a minimum confidence threshold, the one or more processors display a preview image depicting an image of a finished product with the finished design shown thereon.

14. The system of claim 11, wherein if the confidence level meets or exceeds a minimum confidence threshold, the one or more processors display a preview image depicting an image of a finished product with the finished design shown thereon and display an offer to the user to upgrade the design to a premium finished design depicted in the preview image.

15. The system of claim 9, the one or more processors receiving user input modifying the premium finish segment selection, and modifying the premium finish segment selection in accordance with the user input.

* * * * *